United States Patent [19]

Nakane et al.

[11] Patent Number: 5,136,160

[45] Date of Patent: Aug. 4, 1992

[54] OPTICAL UNIT FOR USE IN IMAGE-FORMING APPARATUS

[75] Inventors: Rintaro Nakane, Yokohama; Jiro Egawa, Yokosuka, both of Japan

[73] Assignee: Kabushiki Kaisha Toshiba, Kawasaki, Japan

[21] Appl. No.: 659,225

[22] Filed: Feb. 22, 1991

[30] Foreign Application Priority Data

Feb. 23, 1990 [JP] Japan .................... 2-40923

[51] Int. Cl.$^5$ .......................................... G11B 7/125
[52] U.S. Cl. ................................................ 250/235
[58] Field of Search ............................. 250/236, 235

[56] References Cited

U.S. PATENT DOCUMENTS

| | | | |
|---|---|---|---|
| 4,447,723 | 5/1984 | Neumann | 250/236 |
| 4,720,632 | 1/1988 | Kaneko | 250/235 |
| 4,823,002 | 4/1989 | Saito | 250/235 |
| 4,847,492 | 7/1989 | Houki | 250/235 |
| 4,886,963 | 12/1989 | Ohmori | 250/235 |
| 4,918,306 | 4/1990 | Saito | 250/235 |
| 4,935,615 | 6/1990 | Eiichi et al. | 250/205 |
| 5,016,233 | 5/1991 | Morimoto et al. | 369/44.13 |

OTHER PUBLICATIONS

L. P. Hayes, "Scanner For Opaque Samples." IBM Technical Disclosure Bulletin, vol. 16, No. 9 (Feb. 1974) pp. 2826–2828.

*Primary Examiner*—Constantine Hannaher
*Attorney, Agent, or Firm*—Foley & Lardner

[57] ABSTRACT

In an optical unit, a light beam is emitted from a light source toward a given object. Part of the light beam is reflected by a reflecting mirror and is returned to a monitor diode which is incorporated in the light source. The reflecting mirror is arranged in an optical path along which the light beam is directed from the light source to the object, but is located outside of an image region containing an optical axis and expanding in the main scanning direction. By use of the light beam returned to the monitor diode, the deflection start position from which the light beam emitted from the light source is deflected is detected. In other words, the deflection start timing is detected. A variation in the monitor current produced by the monitor diode is utilized for controlling the light source, to thereby match the horizontal synchronization.

23 Claims, 9 Drawing Sheets

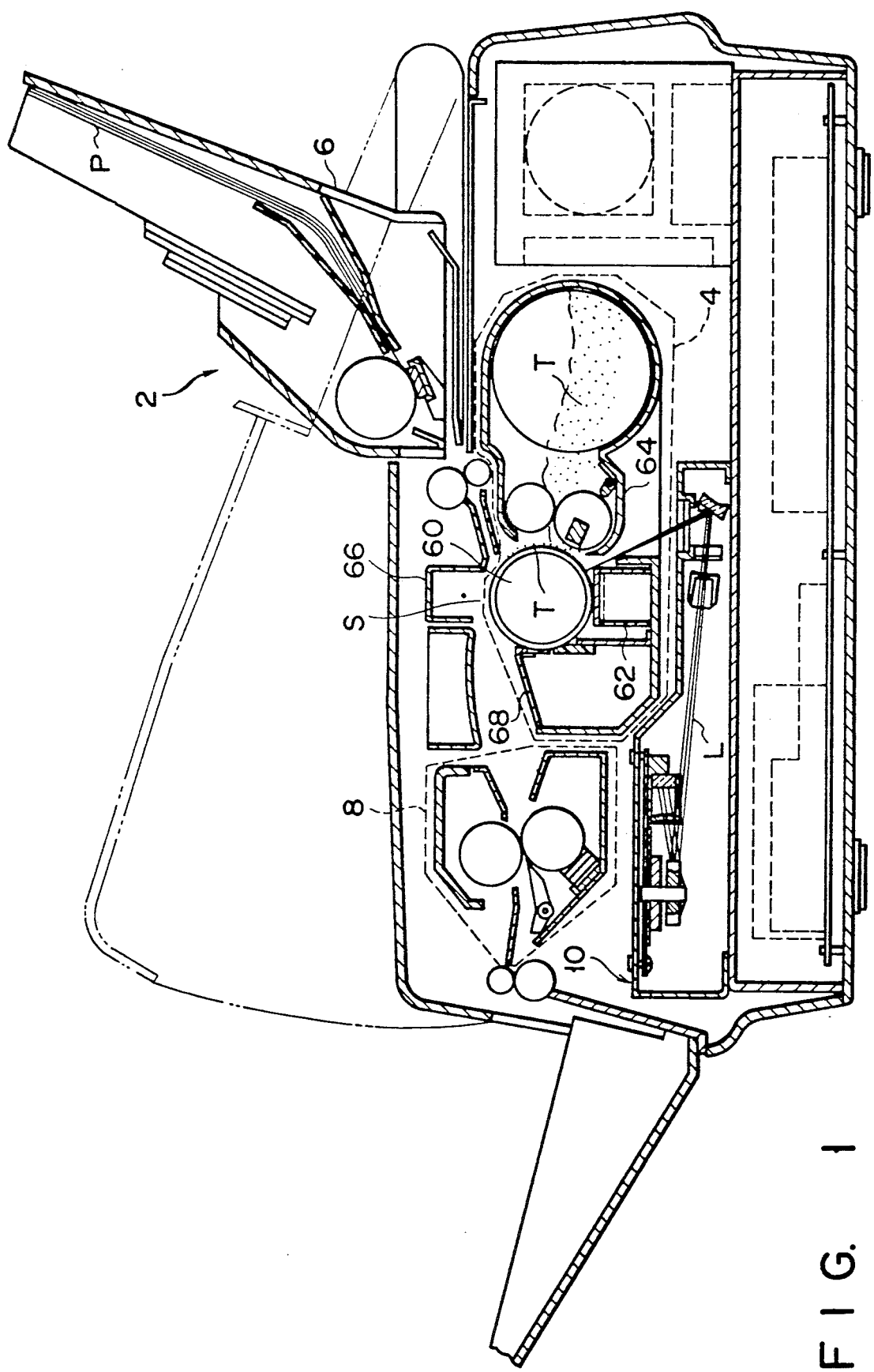

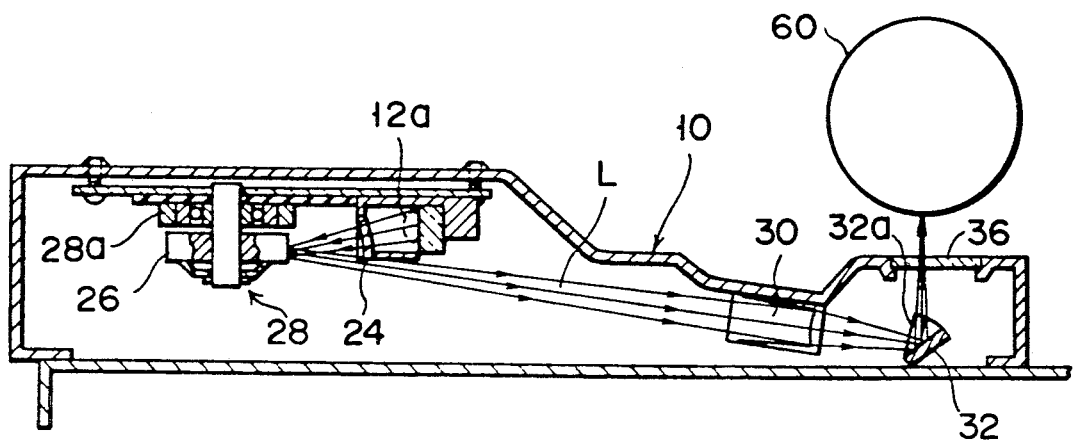
F I G. 2B
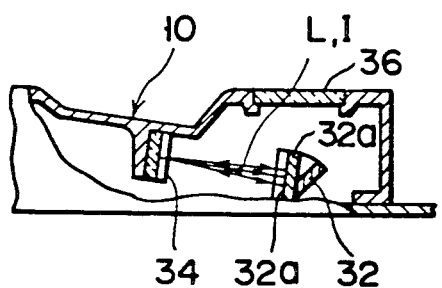
F I G. 2C

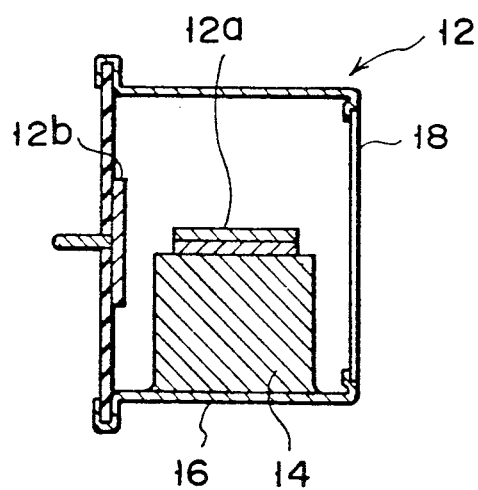
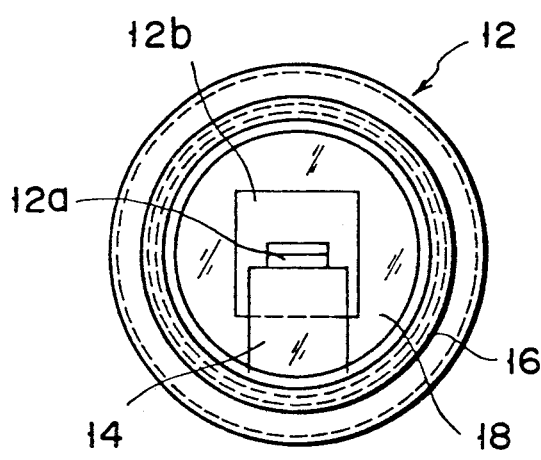
F I G. 4A      F I G. 4B

OPTICAL UNIT FOR USE IN IMAGE-FORMING APPARATUS

BACKGROUND OF THE INVENTION

1. Field of the Invention

The present invention relates to an apparatus for processing character or image information, and more particularly to an apparatus which reads or reproduces information by deflecting a light beam, e.g., a laser beam emitted from a laser beam source. The present invention also relates to an optical unit incorporated in the information reading/reproducing apparatus.

2. Description of the Related Art

An image reader is well known as an example of an information-entering apparatus connectable to a computer. The image reader irradiates a given object with a light beam emitted from a light source, and reads information from the light beam reflected by the object. The light beam emitted from the light source is deflected by an optical deflector, such that it is linearly incident on a desirable position on the object. The optical deflector is capable of changing the beam-deflecting angle steplessly, thus allowing the deflected beam to travel in a desirable direction.

The light source and optical unit mentioned above are integrally assembled as part of an optical unit.

The above optical unit can be employed in an image-forming apparatus of a type which visualizes the information supplied from a host computer and forms a hard copy on a sheet; it can be employed in a digital PPC copying machine, for example.

In addition to the above-noted light source and optical deflector, the optical unit comprises the following: a collimator lens, a focusing lens and a horizontal synchronization detector. The light source is normally constituted by a semiconductor laser diode and incorporates a monitor diode for monitoring the intensity of laser beam emitted from the laser diode. The collimator lens collimates the laser beam to provide it with desirable characteristics, and the optical deflector deflects the collimated laser beam. The focusing lens focuses the deflected laser beam such that the laser beam is focused at a desirable position on a given object. The horizontal synchronization detector matches the horizontal synchronization of the laser beam deflected in the main scanning direction of the object. In general, the horizontal synchronization detector is a photodetector. This photodetector is located outside of a region where the laser beam directed to the object traces an image. The photodetector detects whether the position of the deflected laser beam coincides with the deflection start position determined in the sub scanning direction of the object.

The laser beam emitted from the laser diode is made to have a desirable sectional shape by the collimator lens, and is then deflected by the optical deflector such that it is directed toward the object. The laser beam is focused on the desirable position on the object by the focusing lens.

Each time the laser beam is deflected by the optical deflector, part of the laser beam is cyclically incident on the photodetector which is arranged at the above-noted position is the optical path located between the optical deflector and the object. The laser beam incident on the photodetector is detected as a horizontal synchronization signal.

The horizontal synchronization signal is fed back to the circuit which energizes the laser diode. The signal, thus fed back, is used for controlling the deflection start position of a laser beam already deflected in the main scanning direction of the object such that it corresponds to the deflection start position of a laser beam to be deflected next.

The optical unit is undesirably large in size since it has to contain the following: a photodetector used for detecting a deflected laser beam; a group of electric circuits including a control circuit for converting a signal detected by the photodetector into an electric signal and a transfer circuit for transferring the signal from the control circuit to a main controller; wiring members for connecting the detector and the electric circuits in a predetermined manner; etc. In addition, the electric circuits used for the horizontal synchronization detector are arranged in the optical unit such that they are independent of the electric components of the apparatus which incorporates the optical unit. This being so, measures should be taken for preventing noise between the optical unit and the apparatus. Therefore, the number of parts employed in the apparatus is large, and cost for manufacturing the apparatus is inevitably high.

SUMMARY OF THE INVENTION

Accordingly, an object of the present invention is to provide a small-sized apparatus which reads or reproduces information by deflecting a light beam, as well as a small-sized optical unit incorporated in the apparatus.

Another object of the present invention is to provide an apparatus which reads or reproduces information by deflecting a light beam and which can be assembled with a small number of components or parts at low cost, as well as an optical unit incorporated in the apparatus.

A further object of the present invention is to provide a simplified horizontal synchronization detector which is employed in an optical unit of a light beam deflection type.

According to the present invention, there is provided an optical unit comprising:

means for generating a light beam, means for detecting a power of the light beam generated by the generating means so as to control an output power of the light beam generated by the generating means;

means for deflecting the generated light beam to an object at a predetermined scanning angle;

means for reflecting the light beam which is not directed to the object corresponding to the scanning angle of the light beam deflected by the deflecting means so as to direct the detecting means, wherein the detecting means may detect the light beam reflected by the reflecting means.

A light beam generated from a light source is deflected toward a given object by an optical deflector. The light beam is reflected by a reflecting means cyclically, i.e., each time the light beam is deflected in the main scanning direction, in accordance with the deflection in the main scanning direction. The reflecting means is located outside of a region where the laser beam traveling to the object traces an image. The light beam reflected by the reflecting means returns to the light source along substantially the same optical path of the light beam emitted from the light source. The light beam, thus returning to the light source, is guided to a monitor diode and cyclically changes the monitor output of the monitor diode. The monitor output is compared with a predetermined reference value, so as to detect the deflection start position, i.e., the deflection start timing, of the light beam. In other words, the horizontal synchronization of the light beam directed from the optical deflector to the object is detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic sectional view of an image-forming apparatus which incorporates an optical unit according to one embodiment of the present invention;

FIG. 2B is a sectional view of the optical unit shown in FIG. 2A and shows a state where the deflection angle determined in the sub scanning direction is zero;

FIG. 2C is a sectional view of the optical unit, which is taken along line A—A in FIG. 2A;

FIG. 4A is a sectional view of the semiconductor laser incorporated in the optical unit shown in FIGS. 2A-2C;

FIG. 4B is a schematic view showing how the semiconductor laser indicated in FIG. 4A looks like when viewed from the beam emission side (the portion shown on the right side of FIG. 4A);

DETAILED DESCRIPTION OF THE PREFERRED EMBODIMENTS

Figure 2A:
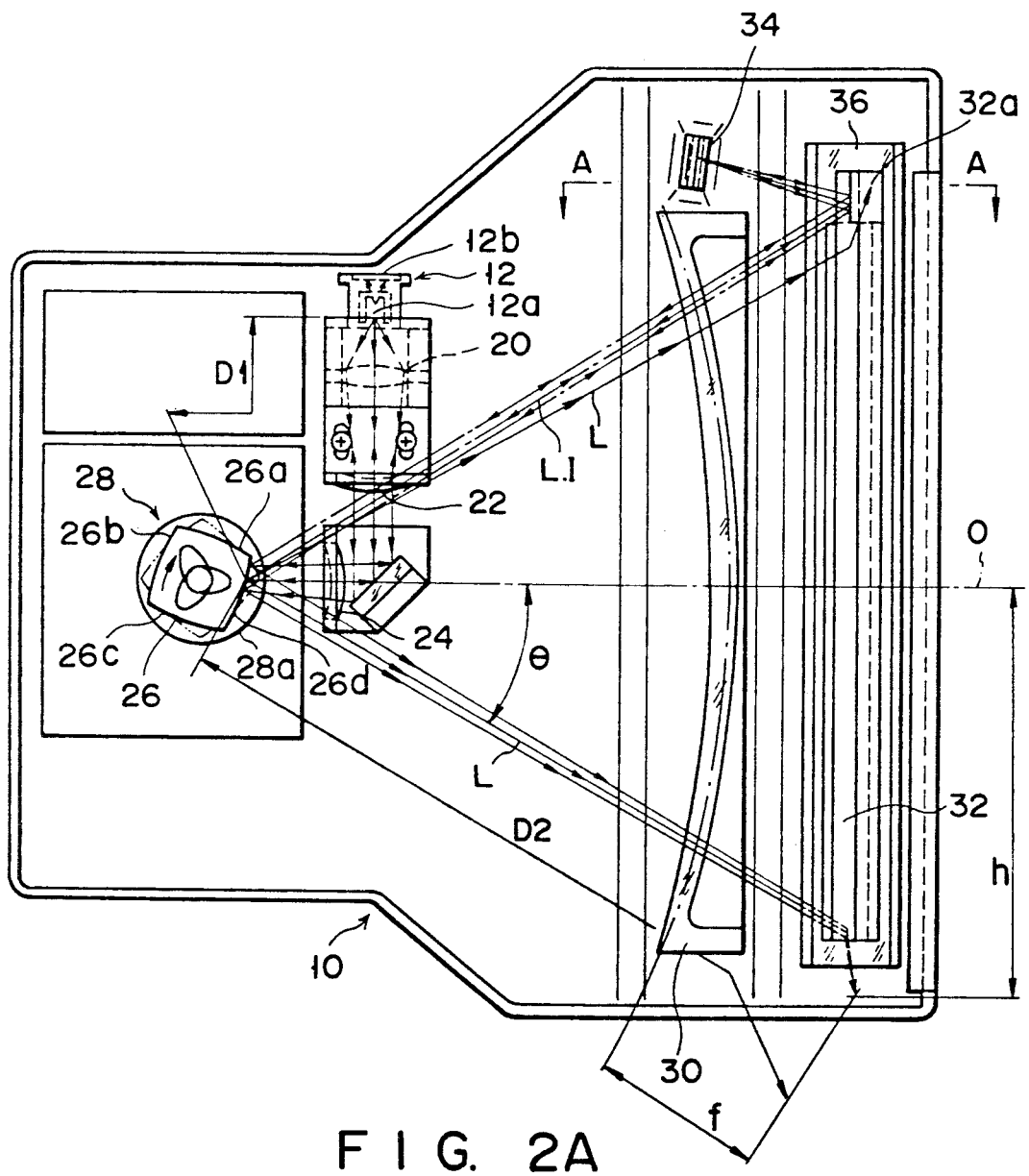
FIG. 2A is a plan view of the optical unit incorporated in the image-forming apparatus shown in FIG. 1, illustration of the cover of the optical unit being omitted for simplicity.

An embodiment of the present invention will now be described with reference to the accompanying drawings.

Referring to FIG. 1, a laser printer apparatus 2 (an example of an image-forming apparatus which utilizes an electrostatic copying process) comprises an optical unit 10 which produces an ON- or OFF-state laser beam L in accordance with the information to be recorded on an information-recording medium or photoconductor to be mentioned later; and an image-forming unit 4 incorporating a photoconductor or a photoconductive drum 60 which expresses the information in the form of a charge distribution pattern by use of the laser beam L emitted from the optical unit 10. Inside the image-forming unit 4, a charging device 62, a developer unit 64, a transferring unit 66, and a cleaning unit 68 are arranged around the drum 60. The charging device 62 sets the drum 60 at a predetermined potential level. The developer unit 64 supplies toner T to an electrostatic latent image formed on the drum 60, to thereby visualize the electrostatic latent image. The transferring unit 66 transfers the visualized image from the drum 60 to a sheet P, e.g., a sheet of copying paper or a plastic film. The cleaning unit 68 removes the residual toner from the drum 60 and erases the charge distribution pattern on the drum 60, to thereby bring the drum 60 into an initial state.

A paper supply device 6, which supplies a sheet P to the image transfer region S, is arranged on the upstream side of the contact point between the drum 60 and the transferring unit 66. A fixing unit 8, which fixes the toner image onto the sheet P, is arranged on the downstream side of that contact point. Although not shown, the printer apparatus 2 further comprises a driving device which drives the devices and units mentioned above, and a power source unit which supplies power to the optical unit 10, the driving device, etc.

The operation of the printer apparatus 2 will be described briefly. Image information, output from an image information output device (not shown) such as an electronic computer or a word processor, is converted into an information signal or a control signal by a CPU (not shown), and is then supplied to the units and devices mentioned above. In accordance with the information signal or control signal, the units and devices are driven, so as to form an image on the drum 60. After being visualized, the image is transferred onto a sheet P, to thereby output image information.

More specifically, the drum 60, the surface of which is electrically charged to a predetermined extent by the charging device 62, is irradiated with the laser beam L emitted from the optical unit 10. By a beam intensity-modulating circuit (to be mentioned later), the intensity of the laser beam L is controlled in accordance with the image information to be recorded. In other words, the laser beam L is turned ON or OFF in accordance with the image information. The laser beam L is moved in the direction parallel to the axis of the drum 60, i.e., in the main scanning direction. With the drum 60 being irradiated with the laser beam L, the charge distribution pattern on the surface of the drum 60 is varied, with the result that an electrostatic latent image is formed. The electrostatic latent image is developed with toner T supplied thereto, so that it becomes a toner image. Since the drum 60 is rotated at a constant speed in the direction perpendicular to the main scanning direction, i.e., in the sub-scanning direction, a continuous toner image is formed on the drum 60.

In synchronism with the movement of the toner image (the rotation of the drum 60), a sheet P is supplied from the paper supply device 6 and is fed to the image transfer region S. The toner image is transferred from the drum 60 onto the sheet P due to the voltage which the transferring unit 66 applies to the drum 60. The sheet P, to which the toner image transferred from the drum 60 is electrostatically adheres, is conveyed to the fixing unit 8. The toner on the sheet P is heated and pressurized, so that the toner is melted and fixed to the sheet P. After this image fixing, the sheet P is discharged from the printer apparatus 2.

Referring to FIGS. 2A-2C, the optical unit 10 comprises a light source 12 for generating a laser beam L, and a lens group which includes a glass lens 20, a first plastic lens 22 and a second plastic lens 24 and provides the laser beam L with desirable optical characteristics. The optical unit 10 further comprises a various kinds of optical elements, such as a polygonal mirror 26, an optical deflector 28, a third plastic lens 30, a folding mirror 32, and a horizontal synchronization-detecting mirror 34. The polygonal mirror 26 has a plurality of reflecting faces 26a, 26b, 26c and 26d and is rotatable. The optical deflector 28 deflects the laser beam L, which is provided with the desirable characteristics by lenses 20, 22 and 24, such that the deflected laser beam L is guided in a desirable direction. The scanning angle $\theta$ at which the laser beam L is deflected by the optical deflector 28, i.e., the angle $\theta$ is defined between the laser beam L and optical axis O, can be varied steplessly. The optical deflector 28 contains a motor 28a, which rotates the polygonal mirror 26 at a desirable speed. In the optical deflector 28, galvano mirrors may be employed in place of the reflecting faces 26a-26d mentioned above. Further, the optical deflector 28 itself may be replaced with a holographic deflector. The third plastic lens 30 focuses the deflected laser beam L on a desirable position on the photoconductor 60. The folding mirror 32 directs the laser beam L in a desirable direction after the laser beam L passes through the third plastic lens 30. The horizontal synchronization-detecting mirror 34 is located outside of a region where the laser beam L directed to the object traces an image. The folding mirror 32 has a reflecting face 32a at one end thereof, and the laser beam L is partly reflected by that reflecting face 32a toward the horizontal synchronization-detecting mirror 34.

Referring to FIG. 2A, a laser beam L emitted from the light source 12 (shown in FIGS. 4A and 4B) passes through the lens group (namely, the glass lens 20, the first plastic lens 22, and the second plastic lens 24), with the result that the laser beam L is provided with desirable optical characteristics. For example, the laser beam L is made to have a desirable cross sectional shape, a desirable diameter, etc. More specifically, the laser beam L is collimated by the glass lens 20. Then, the laser beam L passes through the first plastic lens 22. By this plastic lens 22, the laser beam L is collimated in the first direction, i.e., in the main scanning direction, and is converged in the sub scanning direction perpendicular to the main scanning direction. Thereafter, the laser beam L passes through the second plastic lens 24. By this plastic lens 24, the laser beam L is converged in both the main scanning direction and the sub scanning direction. As will be described later, lens 30 enables the beam falling on the photoconductor 60 to have a constant diameter, without reference to the scanning angle $\theta$ of the laser beam L. Then, the laser beam L is reflected by the polygonal mirror 26, which is integrally assembled with the optical deflector 28, such that it is directed toward the folding mirror 32. The laser beam L passing through the third plastic lens 30 is returned by the folding mirror 32, and is guided to a desirable portion on the drum 60 while being linearly moved in parallel to the axis of the drum 60. The laser beam L is converged with a predetermined focal length f by the third plastic lens 30, and is thus focused on the surface of the drum 60. More specifically, the third plastic lens 30 converges the laser beam L such that point of the drum 60 on which the laser beam falls is proportional to the scanning angle $\theta$ of laser beam L. For example, the laser beam L passing through the center of the lens 30 is made to have a short focal length, while the laser beam L passing through a peripheral portion of the lens 30 is made to have a long focal length. The third plastic lens 30 has such an optical characteristic as is expressed by:

$$h = f\theta$$

where "h" is an image height formed by the laser beam L focused on the drum 60, "f" is a focal length, and "$\theta$" is an angle between the laser beam L and optical axis O. (The image height h corresponds to the distance between optical axis O and that point of the drum which the laser beam L reaches. In practice, the image height h represents a beam-focused point since its size is variable in relation to a change in the angle $\theta$.)

Part of the laser beam L reflected by the reflecting faces 26a-26d of the deflector 28 is reflected by the reflecting face 32a located at one end of the folding mirror 32, such that it is guided to the horizontal synchronization-detecting mirror 34. The laser beam L is reflected by the horizontal synchronization-detecting mirror 34 in the opposite direction to that in which it is incident on the mirror 34, and is returned to the monitor diode 12b of the light source 12 each time the laser beam L is deflected. As described above, the horizontal synchronization-detecting mirror 34 is located outside of a region where the laser beam directed to the object traces an image. More specifically, it is located at a position which is away from the polygonal mirror by substantially the same distance between the reflecting face of the polygonal mirror 26 and the image point h formed on the drum 60 (the distance is determined by the third plastic lens 30 which satisfies the above-noted relationship h=f$\theta$). The position where the synchronization-detecting mirror 34 is located is determined such that, even if the reflecting faces of the polygonal mirror 26 tilt (even if the reflecting faces are shifted in angle from the optical axis), the laser beam L incident on the drum 60 is not greatly shifted in the sub scanning direction from a certain scanning line (such a positional shift of the laser beam L is minimized). Alternatively, the mirror 34 may be arranged at a position where the f$\theta$ characteristic which is a parameter related to h=f$\theta$ and expressed by both dh/d$\theta$=f, df/d$\theta$=0 and f is constant are allowed to have any desirable value. Incidentally, the horizontal synchronization-detecting mirror 34 may be integral with the optical elements of the optical unit 10; alternatively, it may be provided independent of the optical elements of the optical unit 10.

In the optical unit 10 shown in FIGS. 2A-2C, the length of the optical path along which a laser beam L travels from the light source 12 to the polygonal mirror 26 and the length of the optical path along which the laser beam L travels from the polygonal mirror 26 to the drum 60 are conjugated and are substantially equal to each other.

Figure 3:
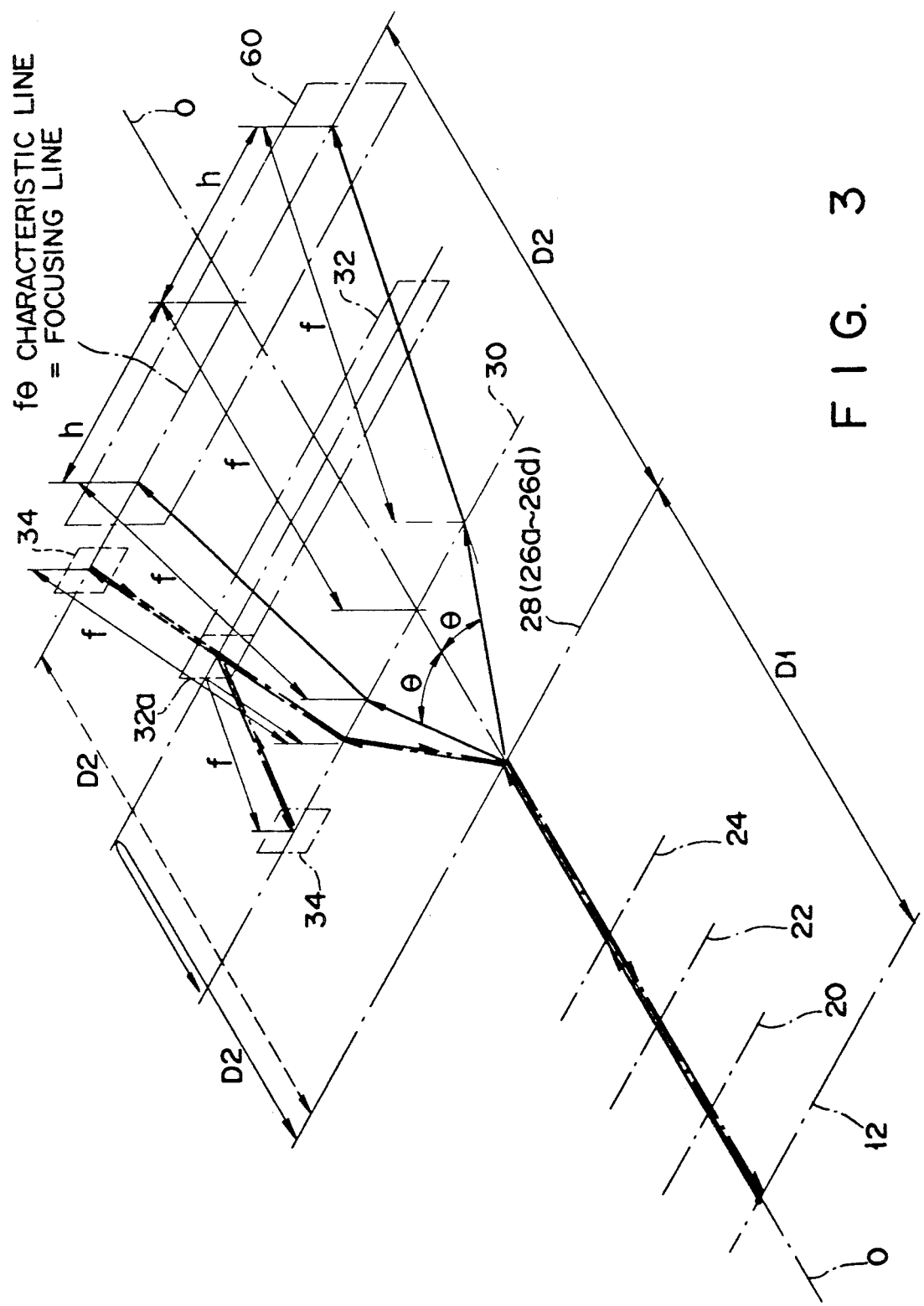
FIG. 3 is a schematic illustration showing how the mirror 34 and optical elements 20, 22, 24, 26 and 30 are arranged.

FIG. 3 is a schematic illustration showing how the mirror 34 and optical elements 20, 22, 24, 26 and 30 are arranged.

As may be understood from FIG. 3, the laser 12 and the photoconductor (drum) 60 are spaced apart by distance D. The glass lens 20, the first plastic lens 22, the second plastic lens 24, the deflector 28 (namely, the polygonal mirror 26 including reflecting faces 26a-26d), the third plastic lens 30 and the folding mirror 32 are arranged between the laser 12 and the photoconductor 60, and these optical elements are arranged from the laser 12 to the photoconductor 60 in the order mentioned.

The polygonal mirror 26 of the deflector 28 can deflect the laser beam L towards the regions on both sides of optical axis 0, with optical axis as a center. As can be seen in FIG. 3, the laser beam L directed from the deflector 28 to the drum 60 travels along the shortest possible optical path if it passes through the optical axis 0. However, the laser beam L travels along a longer optical path if it is deflected by the polygonal mirror 26. The more the laser beam L is deflected, the longer will be the optical path along which the laser beam L travels. This being so, lens 30 has the strongest power at the optical axis, and weaker power at the periphery. In other words, the focal length of lens 30 is determined in accordance with the scanning angle $\theta$ of the laser beam L. (Angle $\theta$ is equal to the angle formed between the optical axis O and a deflected laser beam, and corresponds to the distance between the optical axis on the drum and the position h at which the deflected laser beam L is incident on the drum 60.)

With the above in mind, the position of mirror 34 is determined to satisfy the following:

(1) The mirror 34 has to be arranged in the region where $h = f\theta$ is satisfied;

(2) The position of the mirror 34 has to correspond to a point of the locus which the laser beam L describes on the drum 60;

(3) The mirror 34 has to be arranged in the region where the $f\theta$ characteristics ($dh/d\theta = f$, $df/d\theta = 0$ and $f$ is constant) are satisfactory; and (4) The optical distance D2 between the deflector 28 (mirror 26) and the drum 60 has to be substantially equal to the optical distance D1 between the deflector 28 and the laser 12.

The mirror portion 32a is arranged in such a manner as to permit the mirror 34 to satisfy the requirements (1)-(4) noted above. Needless to say, all requirements (1)-(4) need not be satisfied when the position of the mirror 34 is determined. However, it is likely that the optical path and diameter of the laser beam 1 will be varied due to the optical characteristics of the optical elements, namely, the glass lens 20, the first and second plastic lenses 22 and 24, the deflector 28 and the third plastic lens 30. Examples of such optical characteristics are an entrance pupil, an exit pupil, and aberrations of the mirrors. In some cases, therefore the diameter of the laser beam 1 reflected by the horizontal synchronization-detecting mirror 34 and guided to the monitor diode 12b becomes larger, so that it becomes difficult to accurately detect from the monitor current 1m as a short-period variation of the laser beam 1. In other words, the accuracy of detecting the short-period variation of the laser beam 1 will be degraded. Since, however, the diameter of the laser beam 1 is large, the detection sensitivity of the position detector 56 need not be very high. Therefore, the optical characteristics of the optical elements, such as aberrations of the lenses and mirrors, can be used for the detection of the horizontal synchronization by correcting them to a suitable extent.

Referring to FIGS. 4A and 4B, the light source 12 integrally contains a laser beam-generating element 12a (hereinafter referred to simply as a "laser element") for generating a laser beam L, and a monitor diode 12b, located close to the laser element 12a, for generating a monitor laser beam (hereinafter referred to simply as a "monitor beam") in accordance with the amount of light emitted from the laser element 12a is in contact with a heat sink 14, through which the heat generated by the laser element 12a is radiated. The laser element 12a, the monitor diode 12b and the heat sink 14 are housed in a casing 16. The casing 16 has a glass cover 18, and this glass cover 18 seals the interior of the casing 16 and prevents dust from entering the casing 16.

Figure 5:
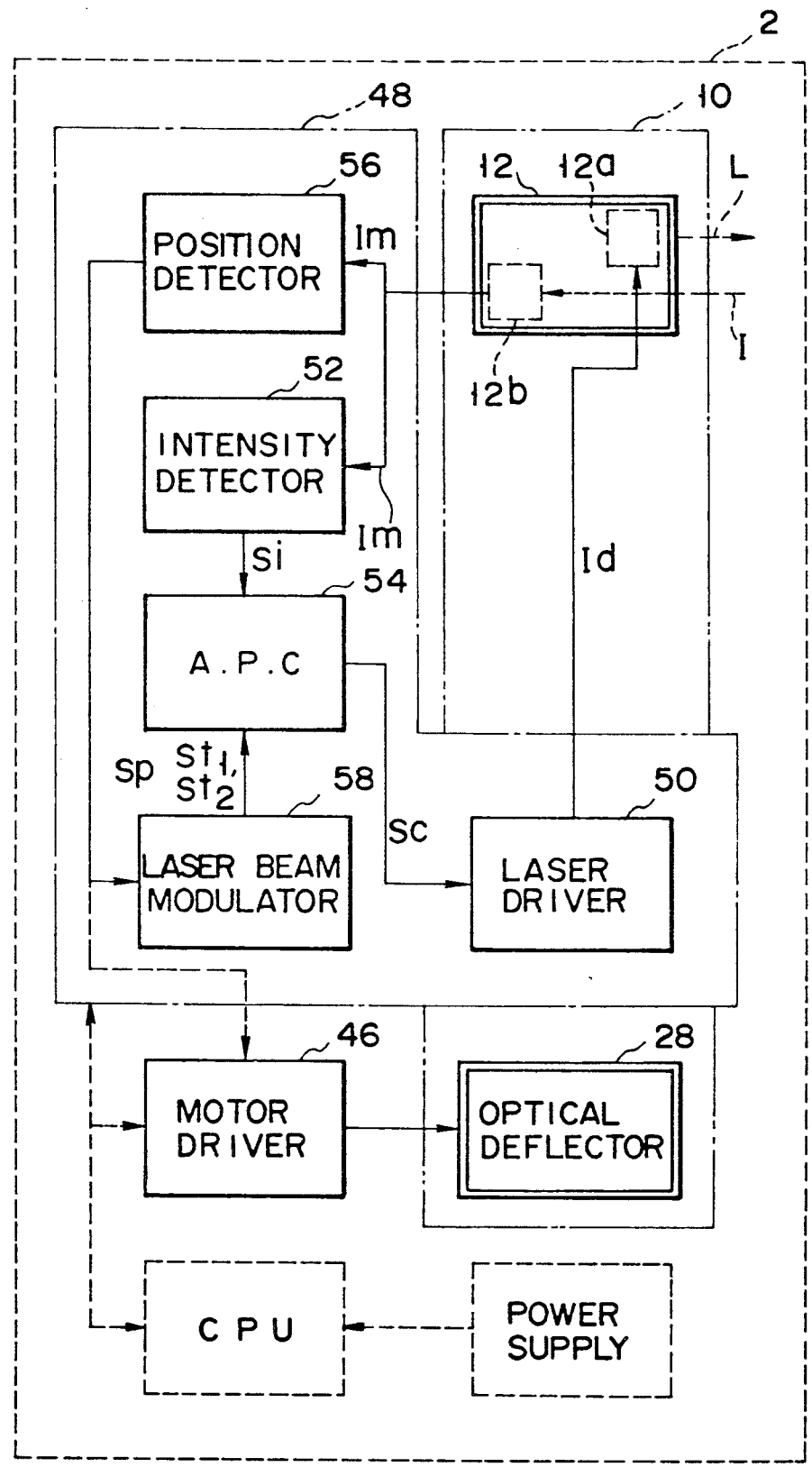
FIG. 5 is a block circuit diagram of the laser beam controller of the optical unit shown in FIGS. 2A-2C.

Referring to FIG. 5, the laser printer apparatus 2 comprises a laser beam intensity controller 48 (hereinafter referred to simply as a "beam controller"). This beam controller 48 is contained in the optical unit 10 or located in the vicinity thereof, and controls the intensity of the laser beam L emitted from the light source 12. The beam controller 48 is made up of: a laser element driver 50 (hereinafter referred to simply as a "laser driver"); a laser beam power-detecting circuit 52 (hereinafter referred to simply as an "power detector"); an automatic power controller (APC) 54; a laser beam position-detecting circuit (hereinafter referred to simply as a "position detector"); and a laser beam modulator 58. The laser driver 50 supplies a laser-driving current Id to the laser element 12a to drive the laser element 12a. The power detector 52 detects beam power variations of the laser beam L at comparatively long intervals by utilizing a monitor current Im output from the monitor diode 12b. The automatic power controller 54 compares an output Si of the power detector 52 with a reference value entered from a reference voltage input point (not shown), and controls the laser-driving current Id on the basis of that comparison. The position detector 56 detects the position of a laser beam 1 which is reflected by the horizontal synchronization-detecting mirror 34 and is returned to the monitor diode 12b. Laser beam 1 is part of the laser beam L reflected by the reflecting faces 26a-26d of the deflector 28, but is guided to the horizontal synchronization-detecting mirror 34, not to the drum 60. Laser beam 1 is produced at intervals shorter than those at which the intensity variations of the laser beam L are detected. The laser beam modulator 58 monitors horizontal synchronization on the basis of an output signal Sp of the position detector 56, and laser driver 50 with a timing signal St (St1, St2) used for actuating the laser element 12a. The motor 28a, which is part of the optical deflector 28 and rotates the polygonal mirror 26 at a desirable speed, is assembled in the optical unit 10, and a motor driver 46 for driving the motor 28a is assembled in the beam controller 48. In the printer apparatus 2, the beam controller 48 and the motor driver 46 are arranged outside of the optical unit 10. Needless to say, however, they may be arranged inside the optical unit 10. Further, the beam controller 48 may be arranged in a main controller (not shown) used for controlling the printer apparatus 2.

Next, a description will be given as to how a laser beam L travels inside the optical unit 10, with reference to FIGS. 2A-2C, 3, 4A-4B and 5.

A laser beam L emitted from the laser element 14 of the light source 12 is first collimated by the glass lens 20, is then converged by the first and second plastic lenses 22 and 24, and is then guided to the polygonal mirror 26. After being deflected by the reflecting faces 26a-26d of the polygonal mirror 26, the light beam L is incident on the third plastic lens 30. By this plastic lens 30, the laser beam L is converged in such a manner as to satisfy the relationship $h = f\theta$. Subsequently, the laser beam L is reflected by the beam-returning mirror 32 such that the reflected laser beam L is directed toward the drum 60.

Part of the laser beam L is reflected by the reflecting face 32a provided at one end of the mirror 32, such that the reflected laser beam L is directed toward the horizontal synchronization-detecting mirror 34.

The laser beam L reflected by the holding mirror 32 passes through the cover 36 of the optical unit 10 and is then focused on the drum 60. The cover 60 the optical unit 10 is formed of a transparent material, such as glass or plastics, and protects the lens group arranged in the optical unit 10 from dust or from the toner used in the image-forming unit 4. To cut off the light beams which may have an adverse effect on the sensitivity of the drum 60, the cover 60 of the optical unit 10 may be formed of filter glass which allows transmission of light beams within a particular wavelength range.

In accordance with the rotation of the reflecting faces 26a–26d of the polygonal mirror 26, the laser beam L is periodically guided to the horizontal synchronization-detecting mirror 34 after being reflected by the reflecting face 32a of the fold mirror 32. The laser beam L is reflected by the horizontal synchronization-detecting mirror 34, and is guided to the monitor diode 12b of the optical unit 10 along substantially the same optical path as that of the laser beam L directed from the laser element 12a to the reflecting mirror 34. More specifically, when the polygonal mirror 26 deflects a laser beam L from the deflection-start point to the deflection-end point for a one-line scan, the deflected laser beam L falls on the reflecting mirror 34 located outside of the image region of the drum 60. That is, the laser beam L is reflected by the mirror 34 once during each scan. Therefore, the horizontal synchronization of the laser beam L deflected toward the drum 60 can be detected, with the laser beam 1 reflected by the mirror being monitored by the monitor diode 12b.

The laser driver 50 supplies the laser element 12a with a laser-driving current 1d. Since the magnitude of the laser-driving current 1d is varied in accordance with the information to be recorded, the amount of laser beam L emitted from the laser element 12a is varied, accordingly. Simultaneous with the emission of the laser beam L, a monitor beam is emitted from the rear portion of the laser element 12a. The intensity level of the monitor beam is varied in a comparatively long period such that the variation corresponds to a variation which the laser beam L may undergo due to a change in the ambient temperature. The monitor diode 12b detects the monitor beam and outputs a monitor current 1m which varies in a comparatively long period. The monitor diode 12b also detects the periodically-produced laser beam 1 which is reflected by the horizontal synchronization-detecting mirror 34 and which is guided by the reflecting face 32a of the folding mirror 32. Therefore, the monitor current output from the monitor diode 12b includes a current component which corresponds to the light beam 1 reflected by the horizontal synchronization-detecting mirror 34 and which represents the deflection of the laser beam L performed by the deflector 28. In short, the monitor current 1m output from the monitor diode 12b includes two current components: a current component which corresponds to the laser beam L emitted from the laser element 12a and which varies in a comparatively long period, and a current component which corresponds to the light beam 1 reflected by the horizontal synchronization-detecting mirror 34 and which varies in a comparatively short period.

The detection sensitivity of the power detector 52 is lower than that of the position detector 56. From the monitor current 1m, the power detector 52 detects the period in which the amount of laser beam emitted from the laser element 12a is varied in accordance with a change in the ambient temperature. That period is longer than the period in which the laser beam 1 is detected by the position detector 56. A luminous intensity signal Si, which represents a variation in the amount of laser beam emitted from the laser element 12a, is detected by the power detector 52, and the detected luminous power signal Si is supplied from the power detector 52 to the automatic power controller 54. In the automatic power controller 54, the luminous intensity signal Si is compared with a reference value entered from the reference voltage input point, and is then converted into a beam amount control signal Sc on the basis of that comparison. This beam amount control signal Sc is supplied to the laser driver 50. Upon receipt of the beam amount control signal Sc, the laser driver 50 controls the magnitude of the laser-driving current 1d, in such a manner as to suppress the variations to which the laser beam L emitted from the laser element 12a is subjected due to changes in the ambient temperature. In the meantime, the position detector 56 detects the laser beam 1 which is reflected by the reflecting mirror 34 and returned to the monitor diode 12b. (The laser beam 1 corresponds to the deflection performed by the deflector 28.) Upon detection of the laser beam 1, the position detector 56 outputs a laser beam positional signal Sp (hereinafter referred to simply as a "positional signal") and supplies it to the laser beam modulator 58. The positional signal Sp represents that the laser beam 1 returned to the monitor diode 12b reaches the deflection-start position, i.e., the horizontal synchronization-detecting mirror 34 arranged for the detection of the deflection start time. On the basis of the positional signal Sp, the laser beam modulator 58 determines the time at which timing signals St1, St2, etc., used for driving both the automatic power controller 54 and the laser driver 50 should be produced. At the time thus determined, the laser beam modulator 58 supplies the timing signal st2 to the laser driver 50. On the basis of the positional signal SP, the laser beam modulator 58 also supplies a timing signal st1 to the automatic power controller 54, in which the timing signal St1 is used for sampling and holding. (In many printer apparatuses, an automatic power controller stabilizes the amount of laser beam by keeping its output signal held when the photosensitive drum is being irradiated with the laser beam for a one-line or one-page scan.) In other words, the sampling and holding timing of the automatic power controller 54 is determined on the basis of the laser beam 1 reflected from the mirror 34. As a result, the laser driver 50 is driven, and the light source 12 emits a laser beam L used for scanning the next line in the main scanning direction. The position detector 56 is provided with a filter, and this filter cuts off the monitor current mentioned above.

As mentioned above, the deflection start position (the deflection start timing) of the laser beams L can be controlled and the horizontal synchronization of them matched by causing the monitor diode 12b (which is integrally assembled with the laser element 12a) to detect part of the laser beam L which is emitted from the laser element 12a and which is guided to the drum 60 and by producing the positional signal Sp on the basis of the detected laser beam.

Figure 6:
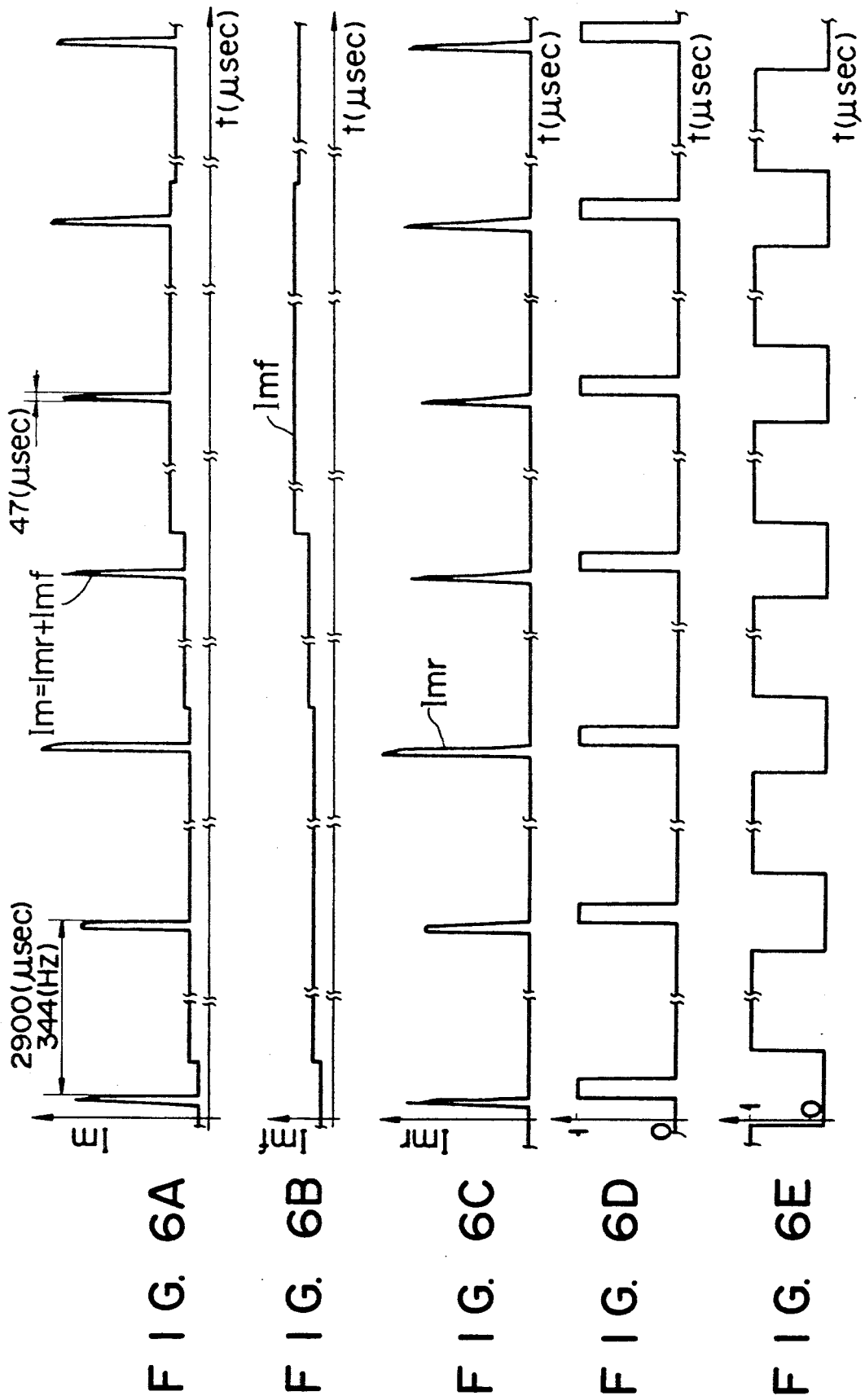
FIGS. 6A-6E are waveform charts showing output waveforms and major timings of a printer apparatus, FIGS. 6A-6E being used for explaining how horizontal synchronization can be detected on the basis of a laser beam reflected from a horizontal synchronization-detecting mirror.

In FIG. 6, that current component of the monitor current 1m which corresponds to laser beam 1 is indicated by Imr, while that current component of the monitor current 1m which corresponds to the laser beam L directed to the drum 60 is indicated by Imf. As may be understood in FIG. 6, current component Imr is produced in a very short period of time, in comparison with the period in which current component Imf is produced.

In an experiment conducted by the inventors, current component Imf gradually varied in a period of about 300 msec. (Due to the use of the automatic power controller 54, a slight variation was observed at comparatively short intervals. In general, the output variation for a 1° C. change in the ambient temperature is of the order of several tens of sec to several min.) (In the experiment, the scanning frequency in the main scanning direction was 344 Hz, and the horizontal synchronization-detecting mirror 34, and the reflecting face 32a for returning a laser beam L to the horizontal synchronization-detecting mirror 34 were arranged in the optical axis.) The monitor current Im has such a waveform as is shown in FIG. 6A. As can be understood from FIGS. 6B and 6C, the monitor current Im can be divided into a current Imr which arises from the laser beam reflected by the mirror 34 and a current Imf which the automatic power controller 54 outputs for the compensation of luminous intensity.

FIGS. 6D and 6E show timings actually used for beam control. More specifically, FIG. 6D shows the time for determining the sampling level which is used for maintaining the output of the automatic power controller 54 at a constant value when the light exposure for a one-line or one-page scan is being carried out. FIG. 6E shows that the drum 60 is irradiated with the laser beam representing information.

Figure 7:
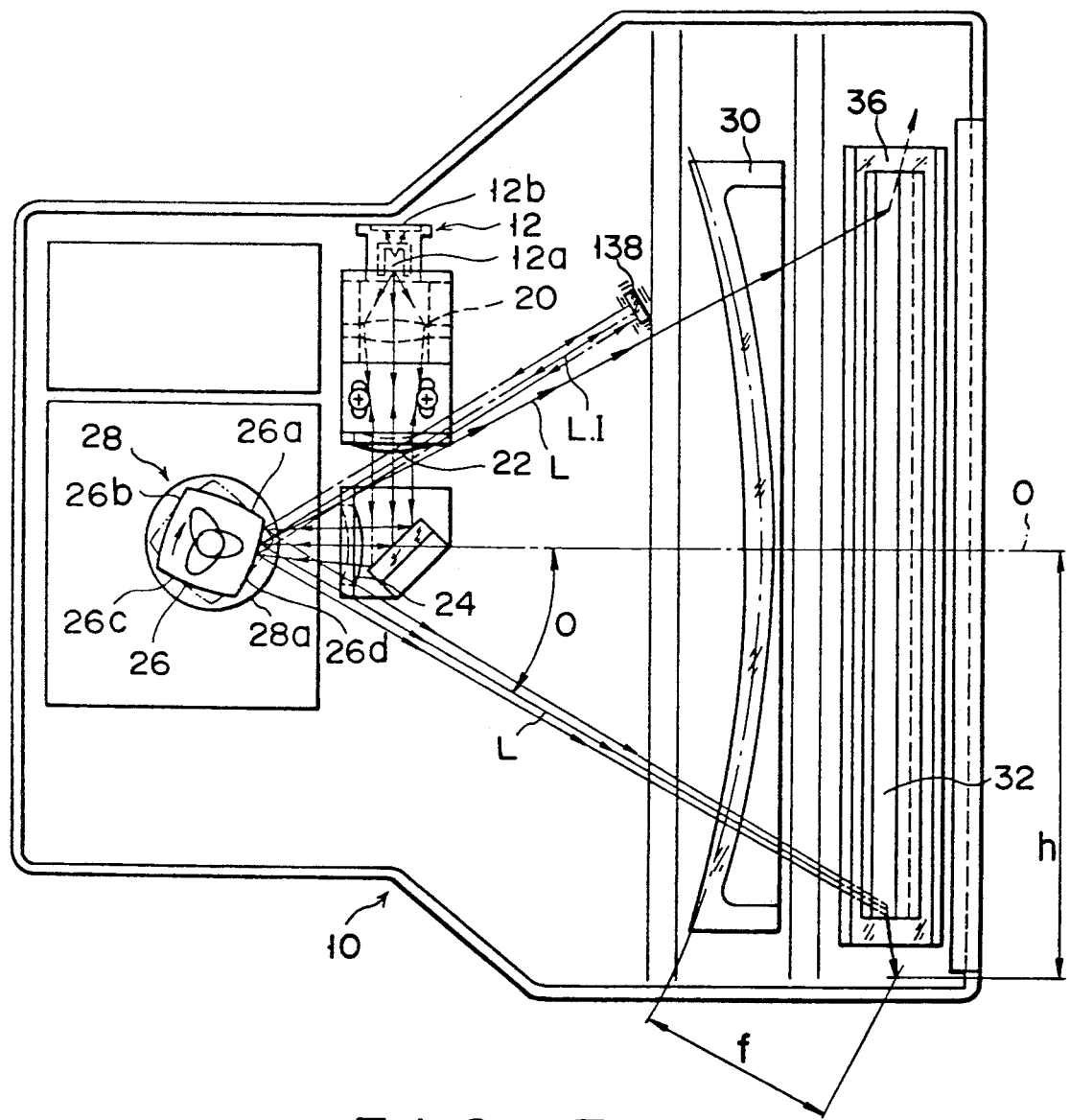
FIG. 7 is a plan view of an optical unit which is different in type from that shown in FIGS. 2A-2C.

FIG. 7 shows an optical unit obtained by modifying the optical unit illustrated in FIGS. 2A-2C. In FIG. 7, the similar or corresponding structural components are denoted by the same reference numerals as used in FIGS. 2A-2C.

Referring to FIG. 7, the optical unit 110 comprises a light source 12 for generating a laser beam L. It also comprises a lens group which is made up of a glass lens 20, a first plastic lens 22 and a second plastic lens 24, and these lenses provide the laser beam L with desirable optical characteristics. The optical unit 110 further comprises a various kinds of optical elements, such as a polygonal mirror 26, an optical deflector 28, a third plastic lens 30, a folding mirror 32, and a horizontal synchronization-detecting mirror 38. The polygonal mirror 26 has a plurality of reflecting faces 26a, 26b, 26c and 26d and is rotatable. The optical deflector 28 deflects the laser beam L, which is provided with the desirable characteristics by lenses 20, 22 and 24, such that the deflected laser beam L is guided in a desirable direction. The optical deflector 28 contains a motor 28a, which rotates the polygonal mirror 26 at a desirable speed. The third plastic lens 30 focuses the deflected laser beam L on a desirable position on the photoconductor 60. The folding mirror 32 directs the laser beam L in a desirable direction after the laser beam L passes through the third plastic lens 30. The horizontal synchronization-detecting mirror 138 is located between the deflector 28 and the third plastic lens 30, and is arranged outside of a region where the laser beam L directed to the object traces an image.

The optical unit 110 shown in FIG. 7 incorporates a light source 12 (i.e., a laser element) which is substantially similar to the light source illustrated in FIGS. 4A and 4B.

In the optical unit 110, a laser beam L emitted from the laser element 14 of the light source 12 is first collimated by the glass lens 20. By the first and second plastic lenses 22 and 24, the laser beam L is converged and its beam component associated with either the main scanning direction or the sub scanning direction is converted into a collimated beam component in the main scanning direction and/or the sub scanning direction. Thereafter, the laser beam L is guided to the polygonal mirror 26. After being deflected by the reflecting faces 26a-26d of the polygonal mirror 26, the light beam L is incident on the third plastic lens 30. By this plastic lens 30, the laser beam L is converged in such a manner as to satisfy the relationship $h=f\theta$ (see FIG. 3). Subsequently, the laser beam L is reflected by the beam-returning mirror 32 such that the reflected laser beam L is directed toward the drum 60. Part of the laser beam L is reflected by the horizontal synchronization-detecting mirror 138, which is located between the deflector 28 and the third plastic lens 30.

The laser beam L reflected by the folding mirror 32 passes through the cover 36 of the optical unit 10 and is then focused on the drum 60. The cover 36 of the optical unit 10 is formed of a transparent material, such as glass or plastics, and protects the lens group arranged in the optical unit 10 from dust or from the toner used in the image-forming unit 4. To cut off the light beams which may have an adverse effect on the sensitivity of the drum 60, the cover 36 of the optical unit 10 may be formed of filter glass which allows transmission of light beams within a particular wavelength range.

Figure 8:
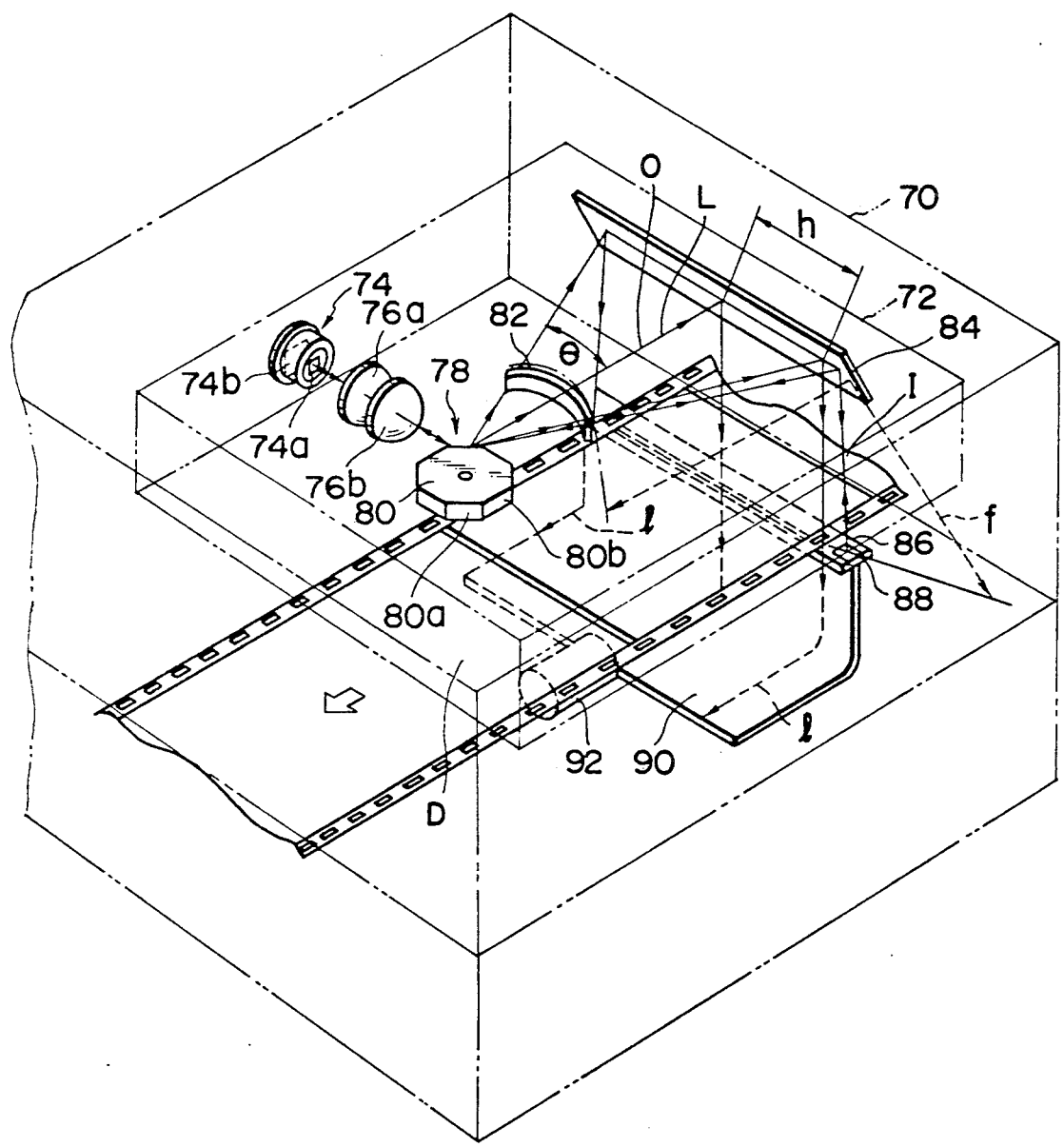
FIG. 8 is a schematic view of an image reader which incorporates the optical unit shown in FIGS. 2A-2C.

An image reader 70, which is connectable to a computer or the like and used for inputting image information, will be described, with reference to FIG. 8. As is shown in FIG. 8, the image reader 70 comprises an optical unit 72, a document table 86, a beam position-detecting mirror 88, a photoconductive element 90, and a photodetector 92. The optical unit 72 reads image information from a given document D, such as a plastic film or a light-transmission paper, by irradiating the document D with a laser beam L. The document table 86 is formed of a transparent material, such as glass, and supports the document D placed thereon. The beam position-detecting mirror 88 is located at one end of the document table 86 and reflects part of the laser beam L back to the optical unit 72. The photoconductive element 90 diffuses laser beam l therein, the (laser beam l being a laser beam which is transmitted through the document table when the document D on the document table 86 is irradiated with the laser beam L, and which represents image information shown on the document D, and conducts the laser beam l to the photodetector 92. The photodetector 92 produces an electric signal which corresponds to the laser beam l and which therefore represents the image information. The optical unit 72 is made up of: a light source 74, a beam-guiding mirror 84, a lens group 76, an optical deflector 78, an $f\theta$ lens 82, and other optical members. The light source 74 generates the above-mentioned laser beam L, and includes a laser element 74a for emitting the laser beam L, and a monitor diode 74b for monitoring the intensity of the laser beam emitted from the laser element 74a. The beam-guiding mirror 84 guides the laser beam L in a desirable direction. The lens group 76 provides the laser beam L with predetermined optical characteristics. For example, it includes a glass lens 76a for collimating the laser beam L, and a plastic lens 76b for converging the laser beam L collimated by the glass lens 76a. The optical deflector 78 reflects the laser beam L at a desirable angle, to thereby deflects the laser beam L in a desirable direction. The optical deflector 78 includes a rotatable polygonal mirror 80 having a plurality of reflecting faces, e.g., four reflecting faces 80a-80d. The optical deflector further includes a motor (not shown) for rotating the polygonal mirror 80. The fθ lens 82 focuses the deflected laser beam L on the document table 86 by allowing the scanning angle θ, the θ is an angle between the laser beam L and optical axis O, to change in proportion to the distance between the optical axis O and the beam-focused point h on the document table 86.

When the laser beam L emitted from the laser element 74a of the light source 74 passes through the lens group 76, its shape is adjusted. Then, the laser beam L is deflected at a constant angular speed by the reflecting faces 80a-80d of the polygonal mirror 80. After passing through the fθ lens 82, the laser beam L is reflected by the beam-guiding mirror 84 and is guided to the document table 86, whereby the document D placed on the table 86 is irradiated with the laser beam L. Part of the laser beam L is transmitted through the document D and is intensity-modulated in accordance with the image information shown on the document D. This laser beam l passes through the document table 86, and is guided to the photo-detector 92 through the photoconductive element 90. The laser beam l is converted into an electric signal by the photodetector 92, and the electric signal is processed in an information processor (not shown). After this processing, the electric signal is supplied to a recording device (not shown), a host computer (not shown), or the like. The information processor includes a bit converter which converts the analog signal output from the photodetector into code data (which is binary or multi-value data), an output circuit for outputting the code data in a predetermined manner, etc.

As in the first embodiment shown in FIGS. 2A through 7, the horizontal synchronization of the laser beam L directed from the light source 74 to the document D can be detected by utilizing the laser beam l directed from the beam position-detecting mirror 88 to the monitor diode 74b. In the image reader shown in FIG. 8, the beam position-detecting mirror 88 constitute part of the document table D, and the laser beam L is partly reflected toward the monitor diode 74b each time the laser beam L is deflected by the optical deflector 78. Therefore, it is not necessary to employ a conventional horizontal synchronization detector or its associated electric circuits.

As has been described, in the present invention, the horizontal synchronization of a laser beam directed from the light source to a given object is detected by causing a beam-reflecting mirror to reflect part of the laser beam and by using the reflected laser beam for the detection of a beam position. Since the horizontal synchronization of the laser beam is detected in this manner, the following optical elements need not be employed in the present invention: a horizontal synchronization-detecting photodetector; a transfer circuit for transferring a signal detected by the photodetector in such a manner as to synchronize the signal with a reference signal; wiring members; and a noise-preventing member. Accordingly, the number of parts or structural components constituting the optical unit of the present invention is smaller than the corresponding number of the conventional optical unit. In addition, since the optical unit is simple in structure, it can be manufactured easily. Moreover, an apparatus incorporating the optical unit can be manufactured at low cost.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical unit comprising:
   means for generating a light beam;
   means located proximate to the light generating means for detecting the power of the light beam generated by the generating means so as to control the output power of the light beam generated by the generating means;
   means for deflecting the generated light beam toward an object at a predetermined scanning angle, the deflecting means including reflecting faces;
   means, arranged between the deflecting means and the object and located in a region where the light beam deflected by the deflecting means toward the object does not reach the object, for reflecting a part of the light beam deflected by the deflecting means to the reflecting faces of the deflecting means, so as to direct said part of the light beam to the detecting means.

2. An optical unit according to claim 1, further comprising:
   means for focusing the light beam on the object such that the distance between an optical axis and a position at which the light beam reaches the object is proportional to the scanning angle of the light beam.

3. An optical unit according to claim 2, wherein said focusing means satisfies:

$$dh/d\theta = f, \; df/d\theta = 0 \text{ and } f \text{ is constant,}$$

where f denotes a focal length of the focusing means, h denotes the distance between the optical axis and the position at which the light beam reaches the object, and θ denotes the scanning angle between the light beam and the optical axis.

4. An optical unit according to claim 2, wherein said reflecting means is located between the deflecting means and the focusing means.

5. An optical unit according to claim 1, wherein said reflecting means is arranged in relation to a focal position at which the light beam is focused on the object.

6. An optical unit according to claim 5, wherein said reflecting means is arranged at a position where said reflecting beam has no adverse effect on the light beam to be focused on the object.

7. An optical unit according to claim 5, wherein said reflecting means arranged at said position satisfies:

$$h = f\theta$$

where f denotes a focal length of the focusing means, h denotes the distance between the optical axis and the position at which the light beam reaches the object, and $\theta$ denotes the scanning angle the optical axis.

8. An optical unit according to claim 5, wherein said reflecting means is arranged such that a position at which the light beam is actually focused and a position at which the light beam should be focused are as close as possible to each other.

9. An apparatus according to claim 1, wherein said detecting means and said generating means are assembled as one unit.

10. An apparatus according to claim 9, wherein said detecting means is positioned in a direction opposite from the direction the light beam generated by the generating means travels toward the object.

11. An apparatus according to claim 1, wherein said detecting means and said generating means are contained in one package.

12. An apparatus according to claim 11, wherein said detecting means is positioned in a direction opposite from a direction the light beam generated by the generating means travels toward the object.

13. An image forming apparatus comprising:
means for generating a light beam;
means located proximate to the light generating means for detecting the power of the light beam generated by the generating means so as to control the output power of the light beam generated by the generating means;
means for deflecting the generated light beam toward the image bearing member at a predetermined scanning angle, the deflecting means including reflecting faces;
means for focusing the deflected light beam on the image bearing member;
means, arranged between the deflecting means and the object and located in a region where the light beam deflected by the deflecting means toward the object does not reach the object, for reflecting a part of the light beam deflected by the deflecting means to the reflecting faces of the deflecting means, so as to direct said part of the light beam to the detecting means; and
means for forming an image corresponding to the generated light beam on the image bearing member.

14. An apparatus according to claim 13, further comprising:
means for determining a timing at which the light beam is generated from said generating means on the basis of the reflected light beam returned to said detecting means.

15. An apparatus according to claim 14, wherein said detecting means includes beam power control means for holding the output power for a predetermined length of time when a signal is supplied from said determining means.

16. An apparatus according to claim 15, wherein said beam power control means continues to hold the output until the reflected light beam coming from the reflecting means is incident on said detecting means at least once.

17. An apparatus according to claim 13, wherein said reflecting means is arranged at a position where said reflecting beam has no adverse effect on the light beam to be focused on the image bearing member.

18. An apparatus according to claim 13, wherein said detecting means and said generating means are assembled as one unit.

19. An apparatus according to claim 13, wherein said detecting means is positioned in a direction opposite from a direction the light beam generated by the generating means travels toward the object.

20. An optical apparatus comprising:
light source means for emitting a light beam, said light source means including a monitoring element for checking the power of the light beam;
means, including reflecting faces, for deflecting the light beam emitted from the light source means toward an object;
means, arranged between the deflecting means and the object and located in a region where the light beam deflected by the deflecting means toward the object does not reach the object, for reflecting a part of a deflected light beam to the reflecting faces of the deflecting means, so as to direct said part of the deflected light beam to the monitoring element; and
means for determining timings at which a next light beam is emitted from the light source means, on the basis of the incidence of the reflected light beam on the monitoring element.

21. An apparatus according to claim 20, wherein said monitoring element is positioned in the opposite direction to that in which the light beam directed toward the object travels.

22. An image forming apparatus comprising:
means for emitting a light beam, said emitting means including a monitoring element for checking the power of the light beam;
an image bearing member, including a predetermined image formation area, for reproducing information represented by the light beam, on the basis of the light beam falling on the image formation area;
means, including reflecting faces, for deflecting the light beam emitted by the emitting means toward the image bearing member in units of one raster scanning line;
means, arranged between the deflecting means and the image bearing member and located in a region which the light beam deflected toward the image formation area does not reach, for reflecting part of a deflected light beam to the reflecting faces of the deflecting means, so as to direct said part of the deflected light beam to the monitoring element; and
means for determining timings at which a next light beam corresponding to one scanning line is emitted from the emitting means, on the basis of the incidence of the reflected light beam on the monitoring element.

23. An apparatus according to claim 22, wherein said monitoring element is positioned in the opposite direction to that in which the light beam directed toward the image bearing member travels.

* * * * *